United States Patent [19]
Kanzaki et al.

[11] Patent Number: 6,137,531
[45] Date of Patent: Oct. 24, 2000

[54] DETECTING DEVICE FOR ROAD MONITORING

[75] Inventors: Yoshiharu Kanzaki; Mikihiro Okamoto; Isao Tofuku; Hiroshi Haruyama, all of Kawasaki, Japan

[73] Assignee: Fujitsu Limited, Kanagawa, Japan

[21] Appl. No.: 08/925,938

[22] Filed: Sep. 8, 1997

[30] Foreign Application Priority Data

Apr. 15, 1997 [JP] Japan ................................. 9-096940

[51] Int. Cl.[7] ....................................................... H04N 7/18
[52] U.S. Cl. ........................... 348/149; 348/169; 382/104; 701/117
[58] Field of Search ................................... 348/149, 144, 348/143, 148, 154, 155, 161, 169, 131, 134, 118; 382/103, 104; 340/905, 601; 701/214, 117; 345/431

[56] References Cited

U.S. PATENT DOCUMENTS

| | | | |
|---|---|---|---|
| 5,467,402 | 11/1995 | Okuyama et al. | 382/104 |
| 5,535,314 | 7/1996 | Alves et al. | 345/431 |
| 5,574,498 | 11/1996 | Sakamoto et al. | 348/169 |
| 5,638,116 | 6/1997 | Shimoura et al. | 348/118 |
| 5,646,853 | 7/1997 | Takahashi et al. | 340/601 |
| 5,706,355 | 1/1998 | Raboisson et al. | 382/104 |
| 5,999,877 | 12/1999 | Takahashi et al. | 701/117 |

*Primary Examiner*—Chris S. Kelley
*Assistant Examiner*—Gims Philippe
*Attorney, Agent, or Firm*—Helfgott & Karas, P C

[57] ABSTRACT

A detecting device for road monitoring which detects traveling states of vehicles on a road (traffic stagnation, stopping of vehicles, etc.) or fallen objects on a road is provided. Luminance change detecting unit prepares background image data by taking a time average of luminance for each picture element, and detects image portions where inputted image data is different in luminance from the prepared background image data. Hue change detecting unit prepares background image data by taking a time average of hue for each picture element, and detects image portions where inputted image data is different in hue from the prepared background image data. Overlapping portion extracting and judging unit extracts overlapping portions between image portions detected by the luminance change detecting unit when it is in the daytime and illuminance is larger than a predetermined value and image portions detected by the hue change detecting unit at the same point of time, and judges the extracted overlapping portions to represent objects to be detected. Comprehensive portion extracting and judging unit extracts comprehensive portions covering image portions detected by the luminance change detecting unit when it is in the daytime and illuminance is smaller than a predetermined value and image portions detected by the hue change detecting unit at the same point of time, and judges the extracted comprehensive portions to represent objects to be detected.

8 Claims, 10 Drawing Sheets

| SWITCH | COLOR DESIGNATION | | | | | | |
|---|---|---|---|---|---|---|---|
| | RED | YELLOW | GREEN | CYAN | BLUE | MAGENTA | WHITE |
| R (40) | ◯ | ◯ | — | — | — | ◯ | ◯ |
| G (41) | — | ◯ | ◯ | ◯ | — | — | ◯ |
| B (42) | — | — | — | ◯ | ◯ | ◯ | ◯ |

| | VEHICLE DETECTION | | | STATIONARY OBJECT DETECTION | | |
|---|---|---|---|---|---|---|
| | DAYTIME | | NIGHTTIME | DAYTIME | | NIGHTTIME |
| | HIGH ILLUMINANCE | LOW ILLUMINANCE | | HIGH ILLUMINANCE | LOW ILLUMINANCE | |
| DIFFERENCE IN LUMINANCE | ON } AND | ON } OR | OFF | ON } AND | ON } OR | ON } OR |
| DIFFERENCE IN HUE | ON | ON | OFF | ON | ON | ON |
| DIFFERENCE IN DESIGNATED COLOR | OFF | OFF | ON | OFF | OFF | OFF |

DETECTING DEVICE FOR ROAD MONITORING

BACKGROUND OF THE INVENTION (1) Field of the Invention

The present invention relates to a detecting device for road monitoring, and particularly to a detecting device for road monitoring which detects, based on image information obtained from a television camera provided in the vicinity of a road, traveling states of vehicles on a road (traffic stagnation, stopping of vehicles, etc.) or fallen objects on a road.

(2) Description of the Related Art

For the sake of safety, it is important that a road supervisor should quickly detect, on a road, traffic stagnation, stopping of vehicles due to a traffic accident, existence of an object fallen from a vehicle, and call attention of succeeding vehicles and/or take suitable measures. This is particularly important on a highway. Since detection of such states needs to be constantly and broadly conducted, it is desirable that it can be automatically conducted without requiring human hands.

Figure 10:
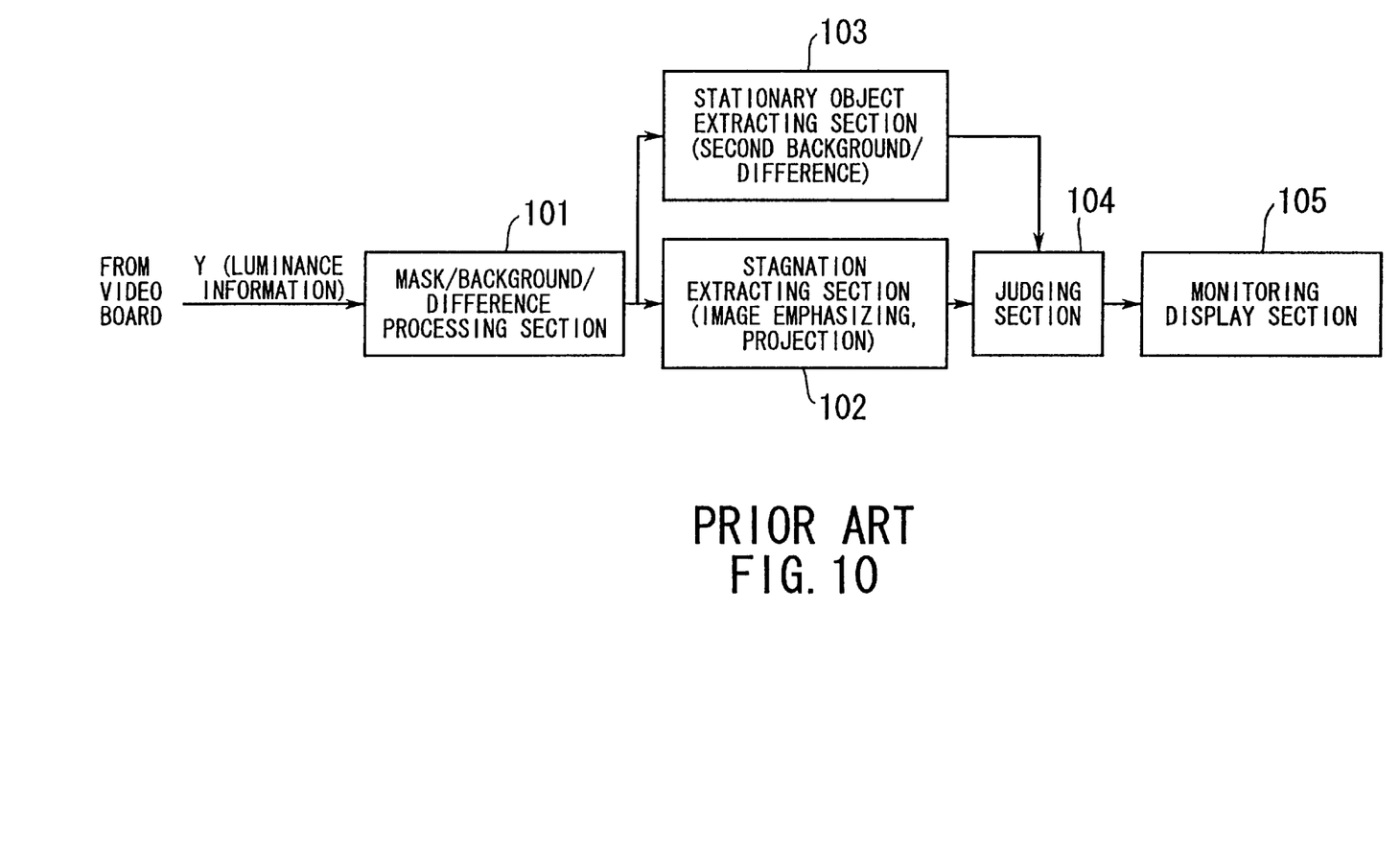
FIG. 10 is a diagram showing an example of formation of a conventional detecting device for road monitoring.

FIG. 10 shows an example of formation of a conventional detecting device for road monitoring. A black-and-white television camera for picking up images of a road is provided in the vicinity of a road. An image taken by the television camera is inputted through a video board to a mask/background/difference processing section 101. The television camera is so positioned that it may watch vehicles traveling on one side of the road from the rear. The mask/background/difference processing section 101 first conducts a mask processing of inputted image data (luminance information) in order to cut out only an image section being processed. Generally, since processing is performed for each lane of a road, an image section corresponding to one lane is cut out. An average of luminance of each picture element constituting the cut-out image section in a first predetermined period of time (for example, from several to over ten seconds) is obtained, thereby to prepare background image data which corresponds to a state of road having no object to be detected (hereinafter "object to be detected" will be expressed as "detection object".). Specifically, the inputted image data is luminance information for each picture element, where each picture element has a value of luminance in 256 gradations. A value of luminance of a picture element in the inputted image data is compared with a value of luminance of a corresponding picture element in the prepared background image data, and if the former is larger than the latter, a value of luminance of that picture element in the background image data is increased by one gradation, and if the former is smaller than the latter, a value of luminance of that picture element in the background image data is reduced by one gradation. Such processing is repeated for the aforementioned first predetermined period of time, so that background image data including hardly any image element of a detection object, therefore, representing almost only the road surface can be obtained.

The mask/background/difference processing section 101 obtains difference in luminance for each picture element between the newly inputted image data and the prepared background image data, and compares the absolute value of the obtained difference in luminance for each picture element (in 256 gradations) with a predetermined threshold value. If the absolute value of the difference in luminance obtained for a picture element exceeds the threshold value, value 1 is given to that picture element. If not, value 0 is given to that picture element. In thus obtained binary data, an image made of picture elements having value 1 is considered as an image of a detected object which is not included in the background image data. The threshold value is a fixed value.

A stagnation extracting section 102 receives the aforementioned binary data from the mask/background/difference processing section 101, and in order to facilitate extraction of features of vehicles, detects edge portions of vehicles and obtains their values projected in Y direction (approximately the traveling direction of vehicles). The obtained projected values are fed to a judging section 104.

A stationary object extracting section 103 receives the aforementioned background image data from the mask/background/difference processing section 101 and prepares second background image data. As mentioned above, the first background image data is prepared by taking an average of the inputted image data in the first predetermined period of time. The second background image data is prepared by taking an average of the first background image data in a second predetermined period of time (for example, several minutes) which is longer than the first predetermined period of time. Then, the stationary object extracting section 103 obtains difference in luminance for each picture element between the first background image data and the second background image data, compares the absolute value of the obtained difference for each picture element (in 256 gradations) with a predetermined threshold value, and obtains the result of comparison as binary data. Thus obtained binary data is considered to represent an image of a vehicle stopping on the road and/or an image of an object fallen from a vehicle. Even if an image of a stopping vehicle and/or a fallen object is included in the first background image data which is obtained by taking an average in the shorter first predetermined period of time, such an image may disappear from the second background image data which is obtained by taking an average in the longer second predetermined period of time. Therefore, when difference between the first and second background image data is obtained, it may reveal an image of a stopping vehicle and/or a fallen object.

A judging section 104 detects individual vehicles based on the aforementioned projected values fed from the stagnation extracting section 102, and calculates the number of vehicles and the velocity of the rearmost vehicle. Based on the calculated number and velocity, the judging section 104 detects a state of traffic stagnation. The judging section 104 further detects existence of a stopping vehicle and/or an object fallen from a vehicle, based on the aforementioned binary data fed from the stationary object extracting section 103.

Based on the result of judgment by the judging section 104, a monitoring display 105 provides indication of traffic stagnation, stopping of vehicles and/or existence of fallen objects.

When it is in the normal daytime and luminance of a road surface is constant, omission of detection and false detection are relatively rare even with the conventional detecting device for road monitoring. However, in the nighttime or in such daytime that luminance of a road surface varies due to movement of clouds, omission and false detection increase. Three cases in which omission and false detection increase will be explained hereunder.

(a) The case in which a vehicle is to be detected in the nighttime.

With the conventional detecting device for road monitoring, a road surface lightened by headlights of a traveling vehicle is falsely judged to be a vehicle. Therefore, it is falsely assumed that a vehicle exists in the front of a traveling vehicle, in a monitored lane into which a traveling vehicle is coming, or in a monitored lane next to a traveling vehicle, though there is actually no vehicle there.

(b) The case in which a fallen object or a stopping vehicle with its taillights put out is to be detected in the nighttime on a road surface provided with no lighting.

Since there is very little difference in luminance between an image of a detection object and its background, omission of detection occurs. If the aforementioned threshold value is lowered, such omission may be prevented. However, due to the lowered threshold value, false detection may increase in the daytime.

(c) The case in which a vehicle or a stationary object is to be detected in the daytime.

When a distinct shadow of a cloud is formed on a road surface and the shadow is moving, that shadow is falsely judged to be a vehicle. In the cloudy daytime and in the morning and evening, difference in luminance between an image of a detection object and its background reduces, so that possibility of omission of detection increases. For example, a vehicle having nearly the same luminance as that of the road surface may fail to be detected.

SUMMARY OF THE INVENTION

An object of the present invention is to provide a detecting device for road monitoring in which possibility of omission of detection or false detection is reduced.

In order to attain the above object, there is provided a detecting device for road monitoring which detects traveling states of vehicles on a road or fallen objects on a road, comprising: a color image pick-up camera for picking up images of a road; luminance change detecting means for detecting, in image data fed from the color image pick-up camera, image portions where the image data is different in luminance from background image data which is prepared by taking a time average of luminance for each picture element; hue change detecting means for detecting, in image data fed from the color image pick-up camera, image portions where the image data is different in hue from background image data which is prepared by taking a time average of hue for each picture element; and overlapping portion extracting and judging means for extracting overlapping portions between image portions detected by the luminance change detecting means when it is in the daytime and illuminance is larger than a predetermined value and image portions detected by the hue change detecting means at the same point of time, and judging the extracted overlapping portions to represent detection objects existing on the road.

In order to attain the above object, there is also provided a detecting device for road monitoring which detects traveling states of vehicles on a road or fallen objects on a road, comprising: a color image pick-up camera for picking up images of a road; luminance change detecting means for detecting, in image data fed from the color image pick-up camera, image portions where the image data is different in luminance from background image data which is prepared by taking a time average of luminance for each picture element; hue change detecting means for detecting, in image data fed from the color image pick-up camera, image portions where the image data is different in hue from background image data which is prepared by taking a time average of hue for each picture element; and comprehensive portion extracting and judging means for extracting comprehensive portions covering image portions detected by the luminance change detecting means when it is in the daytime and illuminance is smaller than a predetermined value and image portions detected by the hue change detecting means at the same point of time, and judging the extracted comprehensive portions to represent detection objects existing on the road.

In order to attain the above object, there is further provided a detecting device for road monitoring which detects traveling states of vehicles on a road or fallen objects on a road, comprising a color image pick-up camera for picking up images of a road; designated-color image portion detecting means for detecting, in image data fed from the color image pick-up camera, image portions having a designated color; color intensity change detecting means for detecting, within the image portions detected by the designated-color image portion detecting means, image portions where the image data is different in color intensity from background image data which is prepared by taking a time average of color intensity for each picture element; and judging means for judging the image portions detected by the color intensity change detecting means in the nighttime to represent detection objects existing on the road.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereunder described referring to the drawings.

Figure 1:
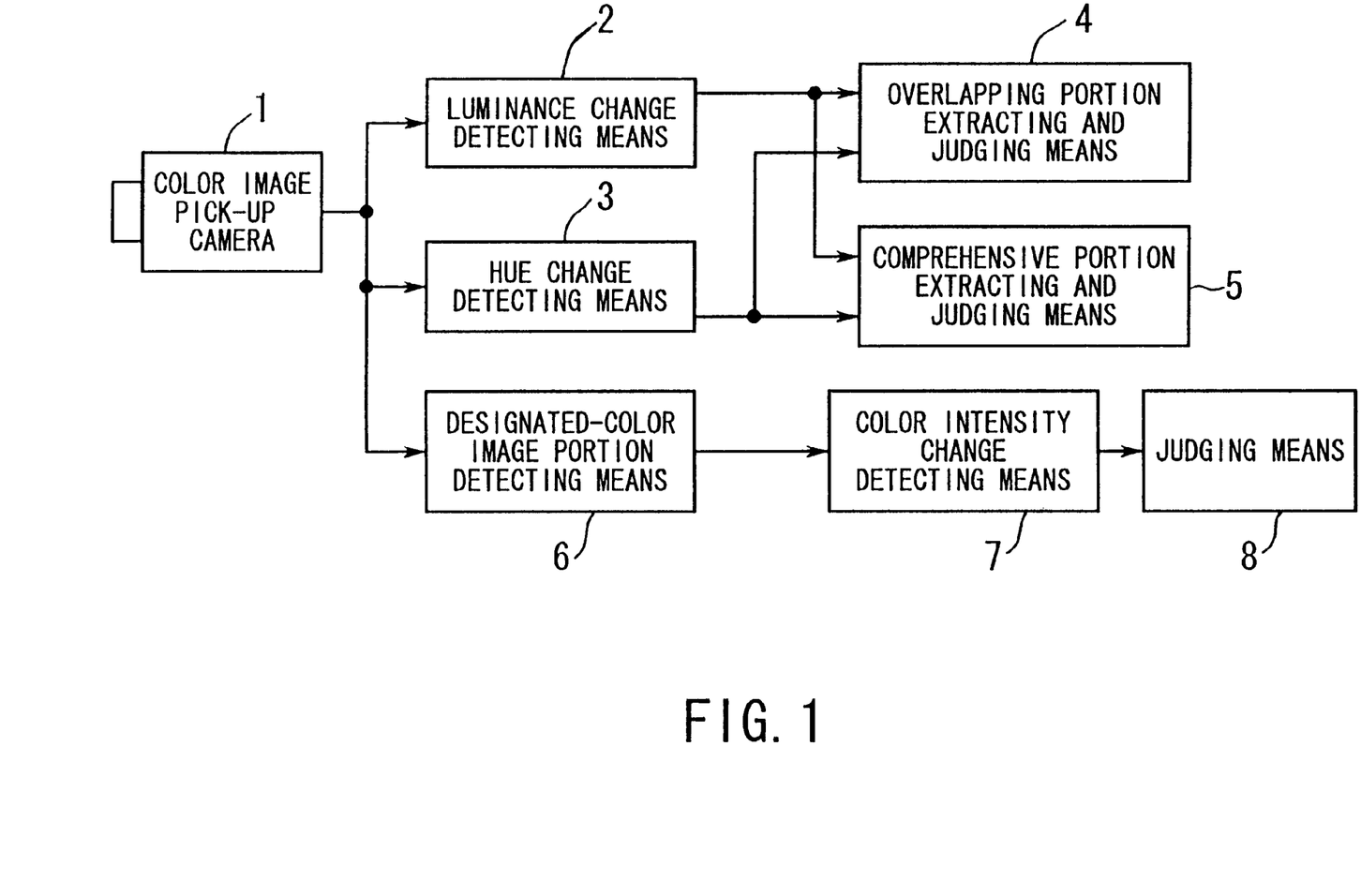
FIG. 1 is a diagram showing basic formation of the present invention.

First, basic formation of an embodiment of the present invention will be described referring to FIG. 1. Basic formation of an embodiment of the present invention includes a color image pick-up camera 1 for picking up images of a road, luminance change detecting means 2 for detecting, in image data fed from the color image pick-up camera 1, image portions where the image data is different in luminance from background image data which is prepared by taking a time average of luminance for each picture element, hue change detecting means 3 for detecting, in image data fed from the color image pick-up camera 1, image portions where the image data is different in hue from background image data which is prepared by taking a time average of hue for each picture element, and overlapping portion extracting and judging means 4 for extracting overlapping portions between image portions detected by the luminance change detecting means 2 when it is in the daytime and illuminance is larger than a predetermined value and image portions detected by the hue change detecting means 3 at the same point of time, and judging the extracted overlapping portions to represent detection objects existing on a road.

An embodiment of the present invention further includes comprehensive portion extracting and judging means 5 for extracting comprehensive portions covering image portions detected by the luminance change detecting means 2 when it is in the daytime and illuminance is smaller than a predetermined value and image portions detected by the hue change detecting means 3 at the same point of time, and judging the extracted comprehensive portions to represent detection objects existing on a road.

An embodiment of the present invention furthermore includes designated-color image portion detecting means 6 for detecting, in image data fed from the color image pick-up camera 1, image portions having a designated color, color intensity change detecting means 7 for detecting, within the image portions detected by the designated-color image portion detecting means 6, image portions where the image data is different in color intensity from background image data which is prepared by taking a time average of color intensity for each picture element, and judging means 8 for judging the image portions detected by the color intensity change detecting means 7 in the nighttime to represent detection objects existing on a road.

A shadow of a cloud, which is formed on a road when it is in the daytime and illuminance is larger than a certain value, is falsely judged to be a detection object, if detection is conducted only by the luminance change detecting means 2. Between an image of a shadow of a cloud and its background is a large difference in luminance but little difference in hue. Considering this fact, in the present invention having the aforementioned formation, the overlapping portion extracting and judging means 4 extracts overlapping portions between image portions detected by the luminance change detecting means 2 when it is in the daytime and illuminance is larger than a predetermined value and image portions detected by the hue change detecting means 3 at the same point of time, and judges the extracted overlapping portions to represent detection objects existing on a road. When it is in the daytime and illuminance is larger than a certain value, a shadow of a cloud is liable to cause false detection. Therefore, in the present invention, the image portions having distinct difference in luminance but little or no difference in hue are not judged to represent images of detection objects.

When it is in the daytime and illuminance is smaller than a certain value, it is difficult to detect an object to be detected relying only on difference in luminance. Therefore, detection is conducted relying not only on difference in luminance but also on difference in hue. Specifically, the comprehensive portion extracting and judging means 5 extracts comprehensive portions covering image portions detected by the luminance change detecting means 2 when it is in the daytime and illuminance is smaller than a certain value and image portions detected by the hue change detecting means 3 at the same point of time, and judges the extracted comprehensive portions to represent detection objects existing on a road.

In the nighttime, vehicles are detected relying on a color of their taillights. Specifically, the designated-color image portion detecting means 6 detects, in image data fed from the color image pick-up camera 1, image portions having a designated color (color of taillights of vehicles). The color intensity change detecting means 7 detects, within the image portions detected by the designated-color image portion detecting means 6, image portions where the image data is different in color intensity from background image data which is prepared by taking a time average of color intensity for each picture element. The judging means 8 judges the image portions detected by the color intensity change detecting means 7 in the nighttime to represent detection objects existing on a road. It is to be noted that picture elements having spectrum of all colors are detected in the image data fed from the color image pick-up camera 1 and excluded from the image portions detected by the designated-color image portion detecting means 6. Each of picture elements constituting an image of a road surface lightened by headlights of a vehicle has spectrum of all colors. Therefore, the picture elements having spectrum of all colors are excluded so that a road surface lightened by headlights may not be falsely judged to be a detection object.

Figure 2:
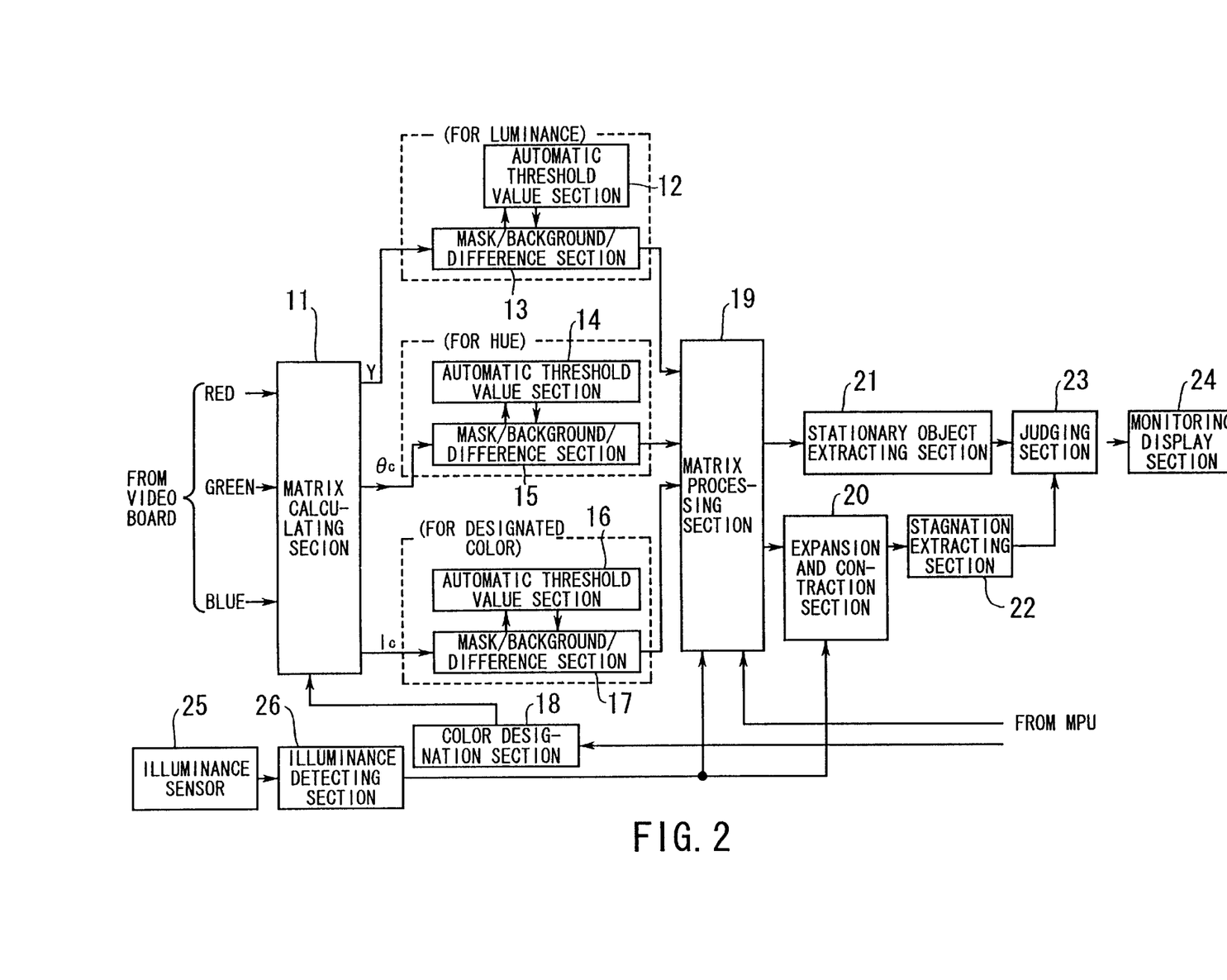
FIG. 2 is a block diagram showing in detail the whole formation of one embodiment of detecting device for road monitoring according to the present invention.

FIG. 2 is a block diagram showing in detail the whole formation of one embodiment of detecting device for road monitoring according to the present invention.

A color television camera (not shown) for picking up images of a road is provided in the vicinity of a road. Color image data (three primary color data) taken by the television camera is inputted through a video board (not shown) to a matrix calculating section 11. The television camera is so positioned that it watches vehicles traveling on one side of the road from the rear. The matrix calculating section 11 calculates luminance information (Y), color information (θc) and designated color information (Ic) based on red color intensity data, green color intensity data and blue color intensity data (respectively in 256 gradations) for each picture element.

Figure 3:
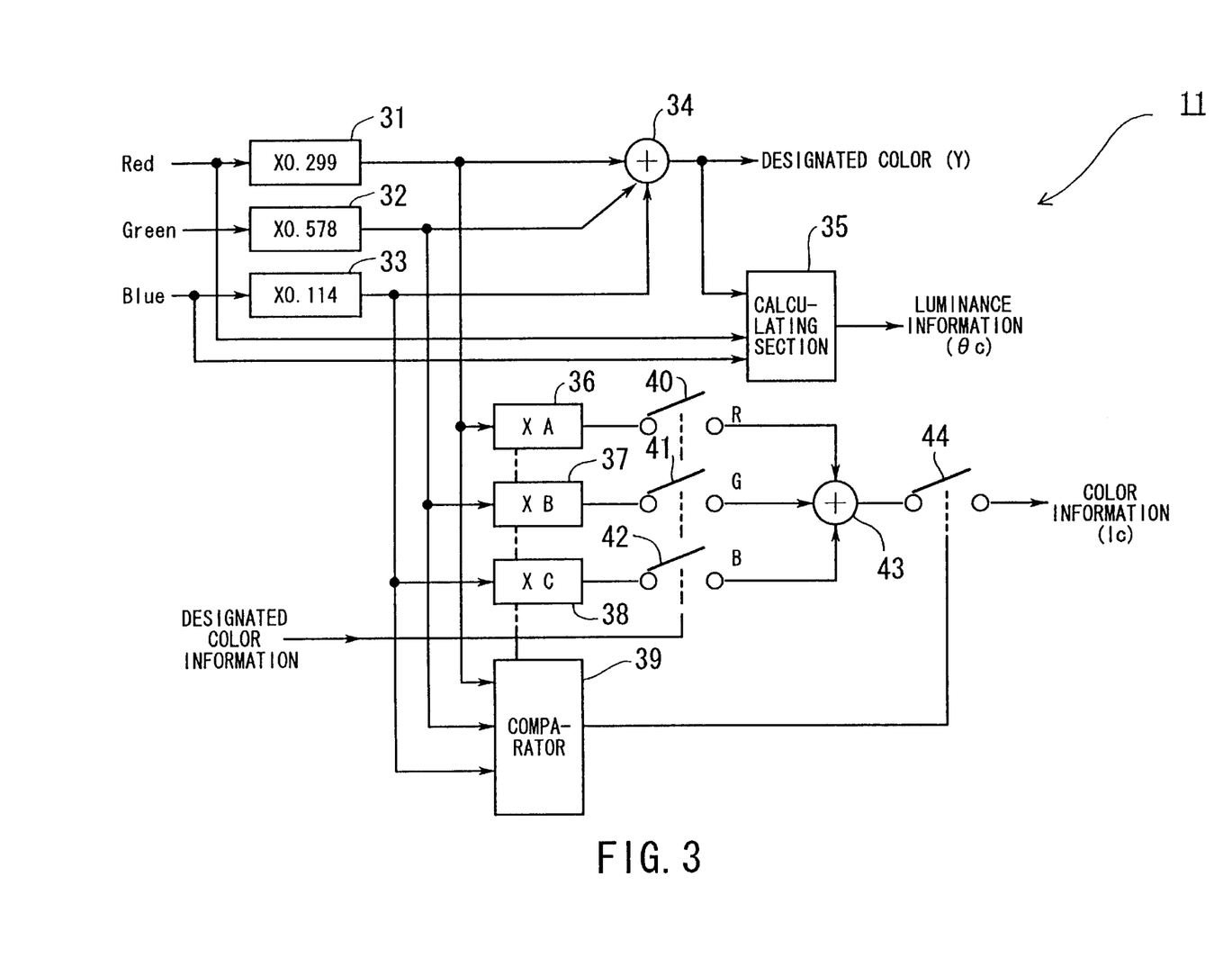
FIG. 3 is a diagram showing internal formation of a matrix calculating section.

FIG. 3 shows internal formation of the matrix calculating section 11. Luminance information (Y) for each picture element is calculated using multipliers 31–33 and an adder 34 based on the following formula (1):

$$Y = 0.299 \times R + 0.578 \times G + 0.114 \times B \tag{1}$$

Specifically, a value of red color intensity R of a picture element is multiplied by a coefficient of 0.299 in the multiplier 31, a value of green color intensity G of the same picture element is multiplied by a coefficient of 0.578 in the multiplier 32, and a value of blue color intensity B of the same picture element is multiplied by a coefficient of 0.114 in the multiplier 33. Then, thus obtained three products are added in the adder 34, and the obtained sum is outputted as luminance information Y of that picture element.

In respect of color information (θc), color information θc of a picture element is calculated in a calculating section 35 using red color intensity R, blue color intensity B and luminance information Y of that picture element based on the following formula (2). The calculation is performed for each picture element.

$$\theta c = \tan^{-1}\{1.78 \times (R-Y)/(B-Y)\} \times 256/360 \qquad (2)$$

Here, the value (256/360) is a coefficient for converting hue information in 360 grades into intensity information in 256 gradations.

In respect of designated color information (Ic), for each picture element, values obtained in the multipliers 31–33 are multiplied by coefficients A, B and C in multipliers 36–38, respectively, and the obtained products are added through switches 40–42 in an adder 43. The value obtained in the adder 43 is outputted through a switch 44 as designated color information Ic. Values obtained in the multipliers 31–33 are compared with predetermined values in a comparator 39, respectively, and when all of those three values exceed the respective predetermined values, the comparator 39 puts the switch 44 off. Values of the coefficients A, B, and C chosen for the multipliers 36–38 and operation of the switches 40–42 are controlled by a color designation section 18 (shown in FIG. 2) according to color designation fed from an external MPU (Micro Processing Unit).

Figure 4:
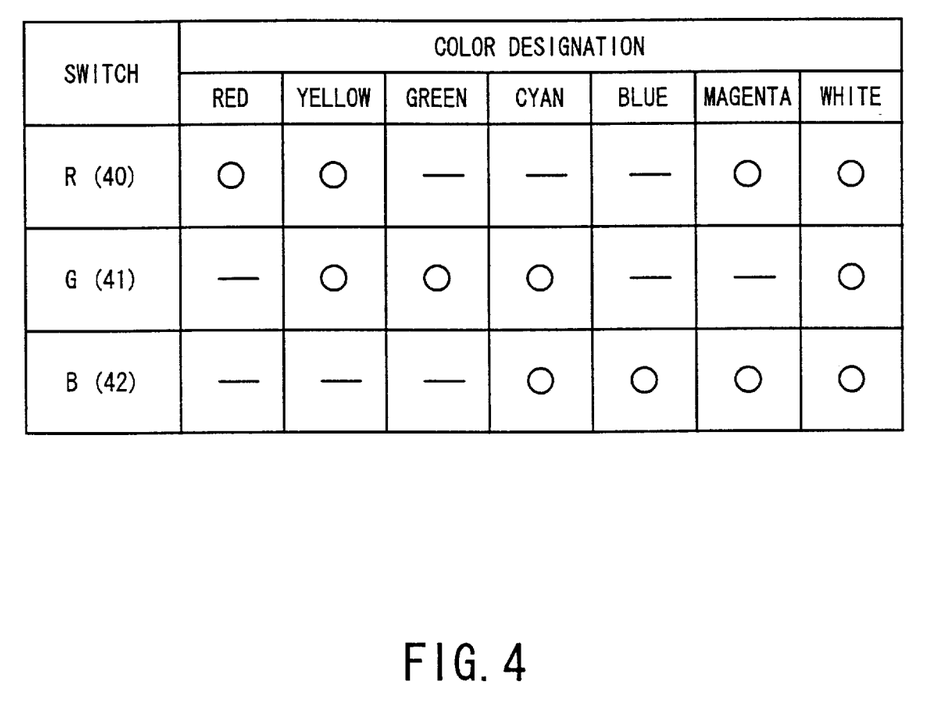
FIG. 4 is a diagram explaining operational control of switches by a color designation section.

FIG. 4 is a diagram for explaining operational control of the switches 40–42 by the color designation section 18. For example, when the color designation section 18 receives color designation of "red", the color designation section 18 puts the switch 40 on and puts the switches 41 and 42 off referring to the diagram of FIG. 4. When receiving color designation of "yellow", the color designation section 18 puts the switches 40 and 41 on and puts the switch 42 off referring to the diagram of FIG. 4. In those cases, values of coefficients A, B and C are respectively chosen to be 1. In the case where an intermediate color other than the colors shown in the diagram of FIG. 4 is designated, values of the coefficients A, B and C are respectively adjusted.

Returning to FIG. 3, when a color of taillights of vehicles is designated as a designated color, operation of the switches 40–42 and values of the coefficients A, B and C for use in the multipliers 36–38 are correspondingly determined. Thus, the value outputted from the adder 43 means intensity of the designated color which a picture element has. In the case where a picture element has a color close to white, that is, it is a picture element constituting an image of a road surface lightened by headlights, the switch 44 is put off by the comparator 39, so that the designated color information Ic for that picture element is null. Thus, the designated color information Ic is outputted only for image portions having a color of taillights of vehicles. It is not outputted for image portions which represents a road surface lightened by headlights.

Returning to FIG. 2, an automatic threshold value section 12 and a mask/background/difference section 13 prepare background image data in respect of luminance, based on inputted luminance information Y, detect image portions where inputted image data is different in luminance from the background image data, and provides the result of detection as binary data. Those operations will be explained referring to FIG. 5.

Figure 5:
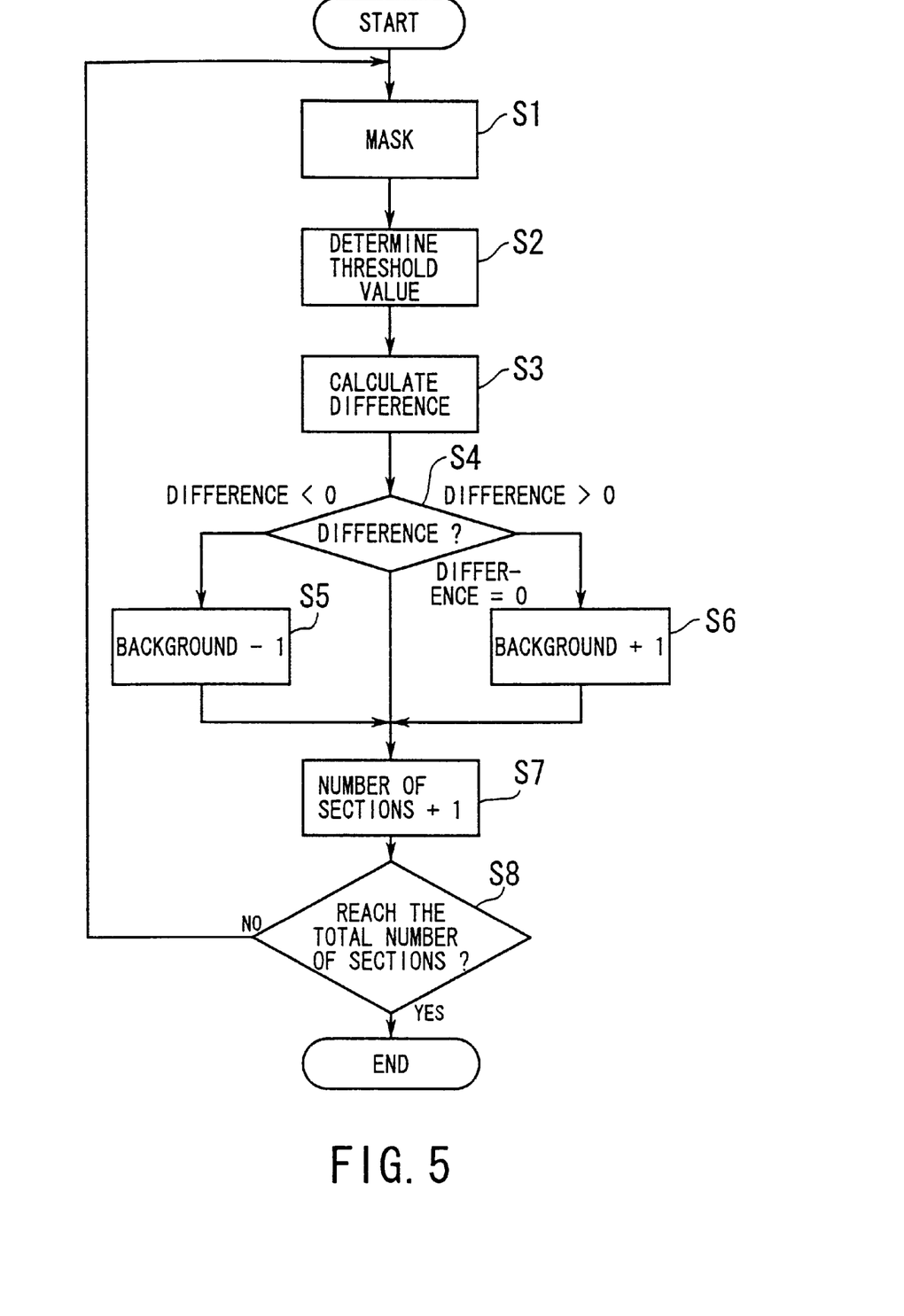
FIG. 5 is a flowchart showing operation of an automatic threshold value section and a mask/background/difference section.

FIG. 5 is a flowchart showing operations of the automatic threshold value section 12 and the mask/background/difference section 13. The process according to this flowchart is performed each time a frame of image is inputted. An explanation will be hereunder made according to step numbers.

[S1] First, the mask/background/difference section 13 conducts a mask processing of inputted image data for cutting out only an image section to be processed.

Figure 6:
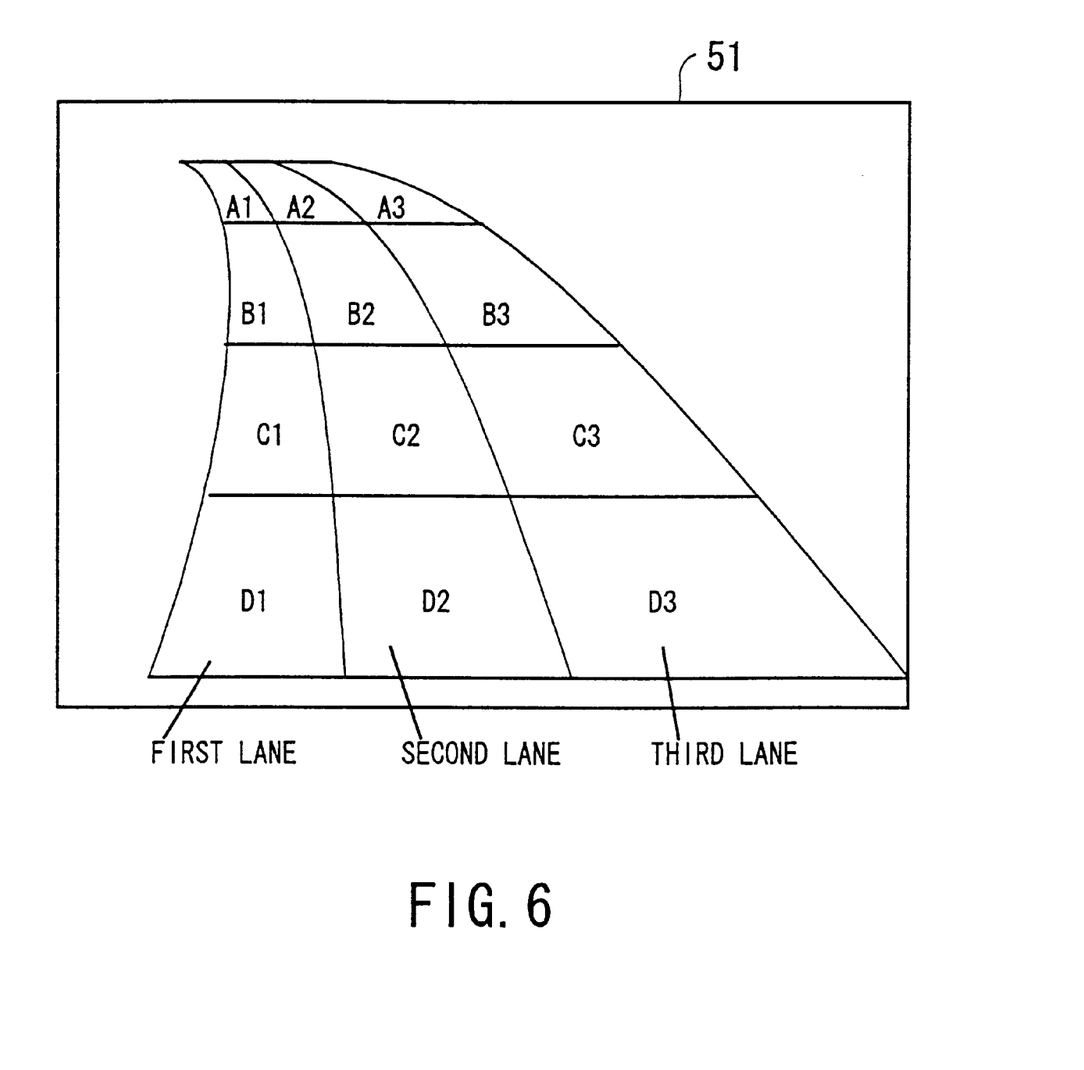
FIG. 6 is a diagram showing an example of image sections to be processed.

FIG. 6 shows an example of image sections to be processed. Luminance information Y upon an image 51 shown in FIG. 6 is inputted to the mask/background/difference section 13. The image 51 represents a road surface having three lanes on one side. The image is divided in the manner that a first lane is divided into image sections A1, B1, C1 and D1, a second lane into image sections A2, B2, C2 and D2, and a third lane into image sections A3, B3, C3 and D3. Each image section covers, for example, an area corresponding to four vehicles. Therefore, image sections representing farther road portions are shown in smaller size in FIG. 6.

In Step S1, one of those image sections is chosen, and luminance information Y for the chosen image section is cut out.

[S2] The automatic threshold value section 12 calculates an average value of luminance of picture elements constituting background image data for a chosen image section. The background image data has been prepared by repeatedly performing Steps S4–S6 for a first predetermined period of time (for example, from several to over ten seconds), which will be described later. Depending on the calculated average value of luminance, the automatic threshold value section 12 determines a threshold value necessary for subsequent Step 3. As the average value of luminance becomes larger, a larger threshold value is determined. It is to be noted that the threshold value is determined for each chosen image section and renewed each time the first predetermined period of time has passed.

[S3] The mask/background/difference section 13 calculates a difference in luminance between each picture element constituting a chosen image section and a corresponding picture element constituting background image data for that image section, and compares the absolute value of the calculated difference in luminance of each picture element (in 256 gradations) with the threshold value for that image section determined in Step S2. If the absolute value of the difference in luminance of a picture element exceeds the threshold value, a value of 1 is given to that picture element. If not, a value of 0 is given to that picture element. An image made of picture elements having value 1 means an image of a detection object which dose not appear in the background image data.

[S4] If a difference in luminance which is obtained by subtracting a value of luminance of a picture element constituting a chosen image section of inputted image data from a value of luminance of a corresponding picture element constituting background image data for that chosen image section is a negative value, the mask/background/difference section 13 proceeds to Step S5, if the difference is a positive value, it proceeds to Step S6, and if the difference is null, it proceeds to Step S7.

[S5] The mask/background/difference section 13 lowers a value of luminance of the corresponding picture element of the background image data for the chosen image section by one gradation.

[S6] The mask/background/difference section 13 raises a value of luminance of the corresponding picture element of the background image data for the chosen image section by one gradation.

Steps S4–S6 are performed for all the picture elements constituting the chosen image section.

[S7] Another image section for which Steps S1–S6 have not been performed yet is chosen for next performance of Steps S1–S6.

[S8] If Steps S1–S6 have been performed for all the image sections A1, B1, C1, D1, A2, B2, C2, D2, A3, B3, C3 and D3 of the image 51, the process according to FIG. 5 is finished. If not, the process returns to Step S1.

As described above, each time a new frame of image is inputted, the process according to FIG. 5 is performed. After the first predetermined period of time has passed, images of any moving objects substantially disappear from the background image data, and the background image data becomes the image data of a road surface alone. Using such background image data obtained after the first predetermined period of time, the mask/background/difference section 13 detects image portions where inputted image data is different in luminance from the background image data (images of objects to be detected) and outputs the result of detection as binary data, as described in Step S3.

Returning to FIG. 2, an automatic threshold value section 14 and a mask/background/difference section 15 prepare background image data in respect of hue, based on inputted color information θc, detect image portions where inputted image data is different in hue from the background image data, and provide the result of detection as binary data. Those operations of the automatic threshold value section 14 and the mask/background/difference section 15 are basically the same as the operations of the automatic threshold value section 12 and the mask/background/difference section 13 shown in FIG. 5. Therefore, explanation will be omitted, only noting that luminance information Y, a value of luminance and a difference in luminance in 256 gradations in the foregoing explanation should be replaced with color information θc, a value of hue and a difference in hue in 360 grades, respectively.

An automatic threshold value section 16 and a mask/background/difference section 17 prepare background image data in respect of color intensity, based on inputted designated color information Ic, detect image portions where inputted image data is different in color intensity from the background image data, and provide the result of detection as binary data. Those operations of the automatic threshold value section 16 and the mask/background/difference section 17 are basically the same as the operations of the automatic threshold value section 12 and the mask/background/difference section 13 shown in FIG. 5. Therefore, explanation will be omitted, only noting that luminance information Y and a value of luminance in the foregoing explanation should be replaced by designated color information Ic and a value of color intensity, respectively.

A matrix processing section 19 receives binary data upon difference in luminance, difference in hue and difference in designated color intensity from the mask/background/difference sections 13, 15 and 17, respectively. The matrix processing section 19 further receives day-and-night discrimination information and daytime illuminance information from an illuminance detecting section 26, and mode designation of a vehicle detection mode or a stationary object detection mode from the MPU. The illuminance detecting section 26 is connected with an illuminance sensor 25 which is provided in a place close to the road and capable of measurement of natural illuminance alone. The illuminance detecting section 26 outputs information upon discrimination between day and night (day-and-night discrimination information) and information upon intensity of illuminance in the daytime (daytime illuminance information) based on electric information fed from the illuminance sensor 25. In control of the illuminance detecting section 26, hysteresis is provided in order to prevent repetition of hunting at the time of changeover. The vehicle detection mode is a mode for detecting vehicles in traffic stagnation, and the stationary object detection mode is a mode for detecting stopping vehicles and fallen objects.

Figure 7:
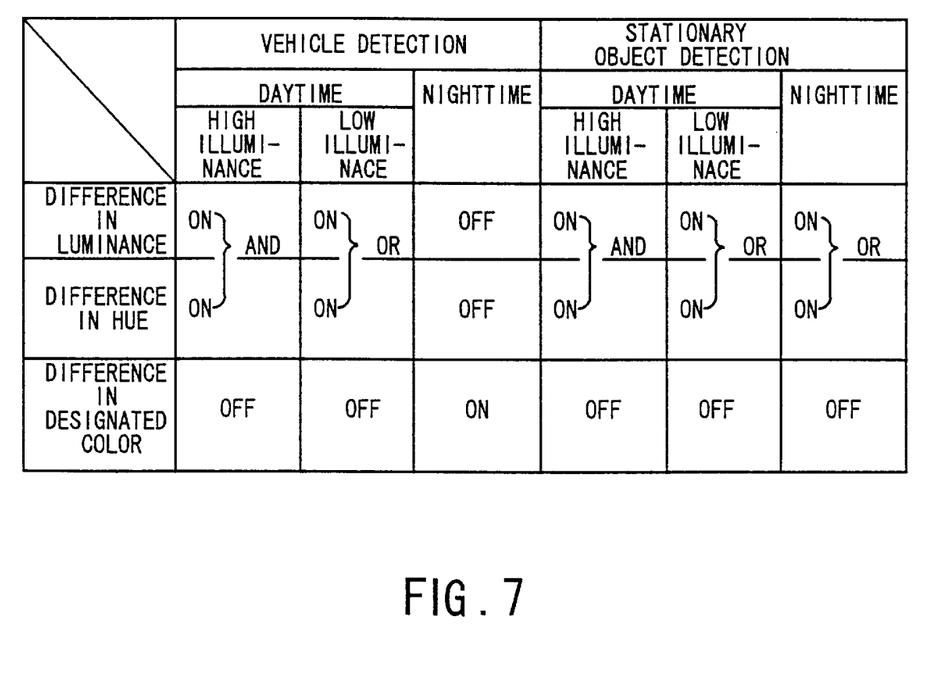
FIG. 7 is a diagram showing logical processing performed by a matrix processing section.

The matrix processing section 19 conducts logical processing as shown in FIG. 7 using the aforementioned binary data upon difference in luminance, difference in hue and difference in designated color intensity, depending upon the detection mode, discrimination between day and night, and intensity of illuminance.

FIG. 7 shows logical processing conducted by the matrix processing section 19. When it is in the daytime and illuminance is larger than a predetermined value, the matrix processing section 19 obtains logical product (AND) of the binary data upon difference in luminance and the binary data upon difference in hue, and outputs the obtained logical product to an expansion and contraction section 20 in the case of vehicle detection mode, and to a stationary object extracting section 21 in the case of stationary object detection mode. A shadow of a cloud, which is formed on the road when it is in the daytime and illuminance is larger than a certain value, is falsely judged to be a detection object, if detection is conducted relying only on difference in luminance. Between an image of a shadow of a cloud and its background is a large difference in luminance but little difference in hue. Considering this fact, overlapping portions between image portions where difference in luminance is detected and image portions where difference in hue is detected are extracted. The extracted overlapping portions can be considered to include no image of a shadow of a cloud. In this case, the binary data upon difference in designated color intensity is abandoned.

When it is in the daytime and illuminance is smaller than a predetermined value, the matrix processing section 19 obtains logical sum (OR) of the binary data upon difference in luminance and the binary data upon difference in hue, and outputs the obtained logical sum to the expansion and contraction section 20 in the case of vehicle detection mode, and to the stationary object extracting section 21 in the case of stationary object detection mode. When it is in the daytime and illuminance is smaller than a certain value, omission of detection is liable to occur if detection is conducted relying only on difference in luminance. Therefore, not only difference in luminance but also difference in hue are utilized for detection. That is, comprehensive portions covering image portions where difference in luminance is detected and image portions where difference in hue is detected are extracted. In this case, the binary data upon difference in designated color intensity is abandoned.

In the nighttime and in the case of vehicle detection mode, the matrix processing section 19 chooses only the binary data upon difference in designated color intensity and outputs it to the expansion and contraction section 20. That is, in the nighttime and in the case of vehicle detection mode, only the binary data upon difference in designated color intensity covering only such image portions that are moving and have a color of taillights of vehicles is outputted. In this case, the binary data upon difference in luminance and the binary data upon difference in hue are abandoned.

In the nighttime and in the case of stationary object detection mode, the matrix processing section 19 obtains logical sum (OR) of the binary data upon difference in luminance and the binary data upon difference in hue, and outputs the obtained logical sum to the stationary object detecting section 21. When it is in the nighttime and a road is not provided with lighting for lightening a road surface, and when objects fallen on the road or vehicles stopping on the road with their taillights put out are to be detected, omission of detection is liable to occur if detection is conducted relying only on difference in luminance. Therefore, not only difference in luminance but also difference in hue are utilized for detection. That is, comprehensive portions covering image portions where difference in luminance is detected and image portions where difference in hue is detected are extracted. In this case, the binary data upon difference in designated color intensity is abandoned.

When it is in the nighttime and a road is not provided with lighting for lightening a road surface, and when objects fallen on the road or vehicles stopping on the road with their taillights put out are to be detected, the threshold value used in producing the binary data upon difference in luminance ought to be rather small (since it is determined depending upon the average value of luminance of the background image data, which is rather small in this case). Therefore, the accuracy of detection of difference in luminance is raised. Further, since an image where detection is to be conducted is divided into a plurality of image sections and detection is conducted for each image section, a threshold value for an image section is not influenced by another image section, even if the latter contains bright portions. Therefore, the accuracy of detection is not deteriorated. Such effects that the accuracy of detection is raised by determining a threshold value depending upon an average of luminance in the background image data, and that a threshold value for an image section is not influenced by another image section because of the concept of dividing inputted image data into image sections are observed in any case of detection (detection in the daytime as well as in the nighttime, detection in any detection mode).

Further, such techniques as determining a threshold value depending upon an average of luminance in the background image data, and dividing inputted image data into image sections, thereby protecting a threshold value in an image section from influence of other image sections can be applied to a detecting device for road monitoring which is not provided with a matrix processing section 19.

Returning to FIG. 2, the expansion and contraction section 20 receives from the matrix processing section 19 the aforementioned logical product of the binary data upon difference in luminance and the binary data upon difference in hue and the logical sum of the binary data upon difference in luminance and the binary data upon difference in hue in the case of daytime, and the binary data upon difference in designated color intensity in the case of nighttime. The expansion and contraction section 20 further receives the day-and-night discrimination information from the illuminance detecting section 26. The expansion and contraction section 20 performs, in the case of nighttime, expansion and contraction processing of the binary data upon difference in designated color intensity, and outputs thus processed data to a stagnation extracting section 22. In the case of daytime, the expansion and contraction section 20 performs no processing of the aforementioned logical product and logical sum and transfers them as they are to the stagnation extracting section 22. The expansion and contraction processing is a image processing for making a pair of images of taillights into one image. In the binary data upon difference in designated color intensity, taillights of a vehicle are normally represented in the form of two images being in line in X direction (direction transversal to the lanes). Expansion and contraction in X direction of those two images are repeated several times, thereby making them into one image.

The stagnation extracting section 22 receives from the expansion and contraction section 20 the expansion-and-contraction processed data upon difference in designated color intensity, the logical product of the binary data upon difference in luminance and the binary data upon difference in hue or the logical sum of the binary data upon difference in luminance and the binary data upon difference in hue. In order to facilitate extraction of features of vehicles for each lane, the stagnation extracting section 22 detects edge portions and obtains values of the detected edge portions projected in Y direction (approximately, traveling direction of vehicles). The stagnation extracting section 22 outputs those projected values to a judging section 23.

Figure 8:
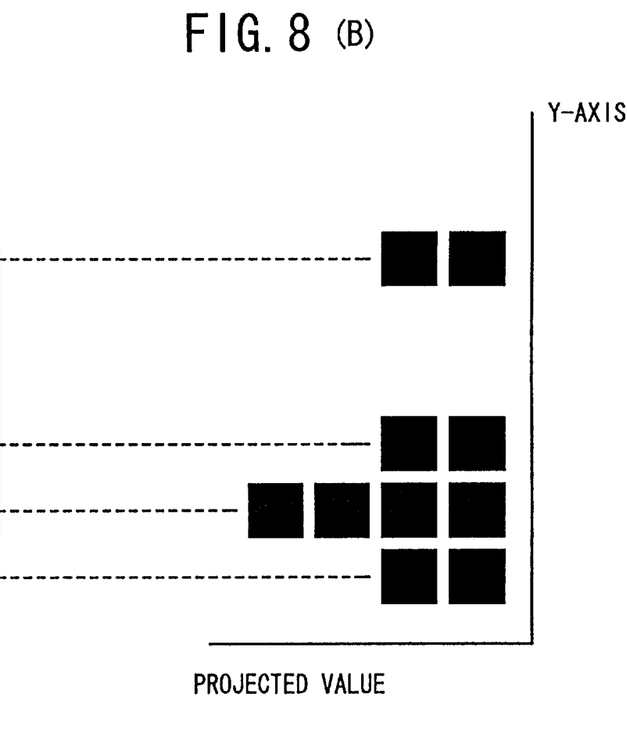
FIG. 8(A) is a diagram showing examples of edge images on a first lane.
FIG. 8(B) is a diagram showing examples of values of edge images projected in Y direction.

FIG. 8(A) shows examples of edge images on a first lane, and FIG. 8(B) shows examples of values of edge images projected in Y direction.

The stationary object extracting section 21 receives from the matrix processing section 19 the logical product of the binary data upon difference in luminance and the binary data upon difference in hue or the logical sum of the binary data upon difference in luminance and the binary data upon difference in hue. The stationary object extracting section 21 further receives from the mask/background/difference sections 13, 15 through the matrix processing section 19 the background image data in respect of luminance and the background data in respect of hue. The respective background image data are, as mentioned above, prepared by the mask/background/difference sections 13, 15 by taking an average of inputted image data in the first predetermined period of time. The stationary object extracting section 21 further takes an average of each background image data in a second predetermined period of time which is longer than the first predetermined period of time (for example, several minutes), thereby to produce each second background image data. Differences between each pair of first and second background image data are calculated for each picture element, the absolute values of the obtained differences (in 256 gradations) are compared with a predetermined threshold value, and the result of comparison is provided as binary data. Thus obtained binary data is considered to represent vehicles stopping on the road or objects fallen from vehicles. Even if the first background image data, which is prepared by taking an average in the shorter first predetermined period of time, include images of stopping vehicles or objects fallen from vehicles, those images of stopping vehicles and objects fallen from vehicles may disappear from the second background image data which is obtained by taking an average in the longer second predetermined period of time. Therefore, when difference between the first and second background image data is obtained, images of stopping vehicles or objects fallen from vehicles may appear in the obtained difference.

The judging section 23 detects individual vehicles based on the projected values fed from the stagnation extracting section 22, and calculates the number of vehicles and the velocity of the rearmost vehicle. The projected value is the number of picture elements having value 1 counted in Y direction. If the counted number of those picture elements exceeds a predetermined value, those picture elements are judged to represent detection object. Based on the length in Y direction, individual vehicles are identified, and the number of vehicles and the velocity of the rearmost vehicle are calculated. The state of traffic stagnation is detected based on thus obtained number and velocity. The judging section 23 also detects existence of stopping vehicles and objects fallen from vehicles based on the binary data fed from the stationary object extracting section 21. Utilizing the projected values fed from the stagnation extracting section 22, it can be judged whether an object in question has come in from an end of a frame and gradually stopped in the frame or it has been suddenly appeared in a frame. Thus, a stopping vehicle and an object fallen from a vehicle can be discriminated.

Based on the result of judgment by the judging section 23, a monitoring display section 24 provides indication of traffic stagnation, stopping vehicles, fallen objects or the like. That is, when traffic stagnation, stopping vehicles, or fallen objects are detected, the monitoring display section 24 provides relevant pictures or letters and numbers expressing the situation.

Figure 9:
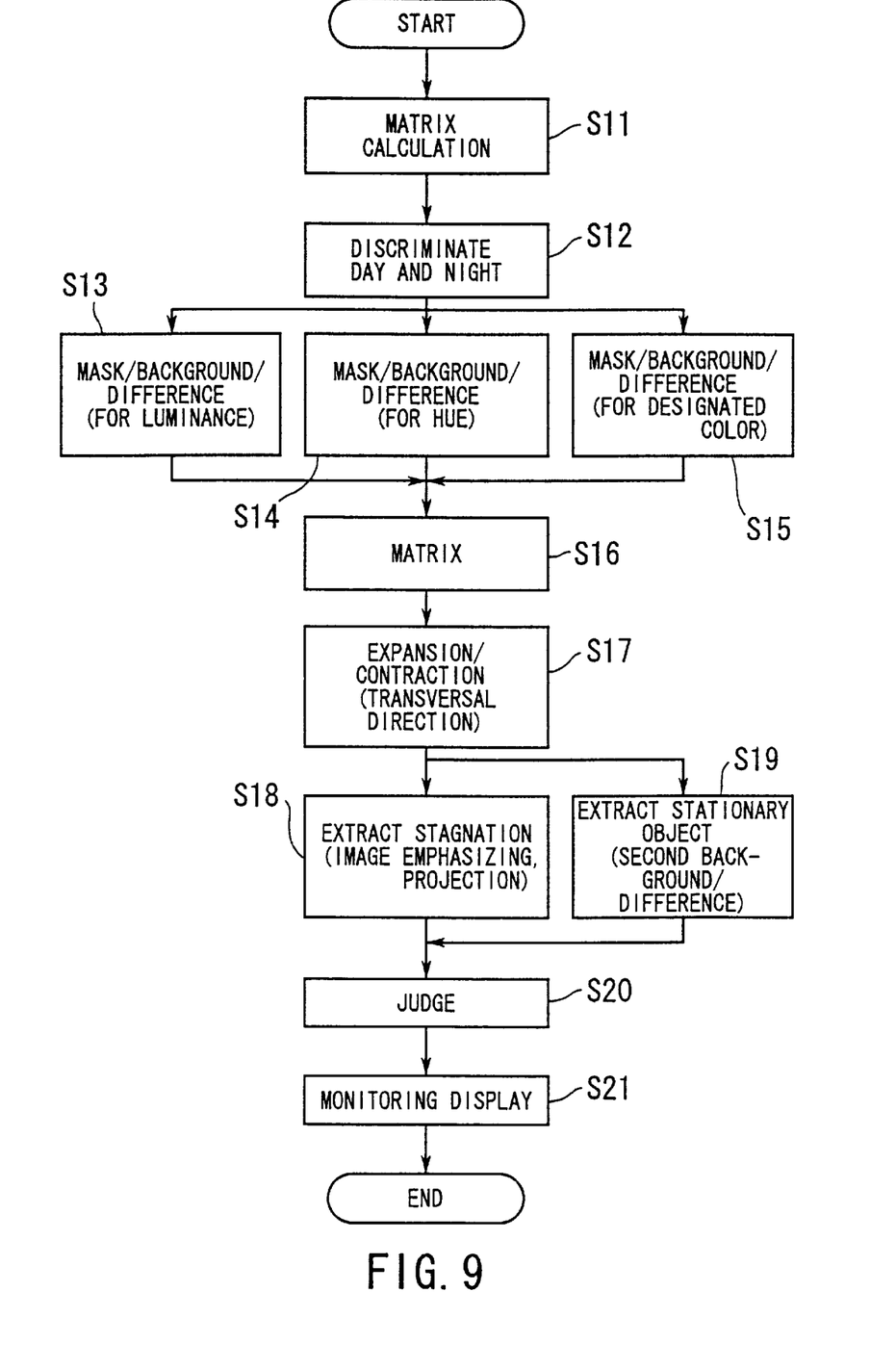
FIG. 9 is a flowchart showing a summary of operation of a detecting device for road monitoring according to the present invention.

FIG. 9 is a flowchart showing a summary of operations of the detecting device for road monitoring according to FIG. 2. Explanation will be hereunder made according to step numbers.

[S11] The matrix calculating section 11 calculates luminance information (Y), color information (θ c) and designated color information (Ic) based on red, green and blue color intensity data (in 256 gradations) for each picture element.

[S12] The illuminance detecting section 26 outputs day-and-night discrimination information and daytime illuminance intensity information.

[S13] The mask/background/difference section 13 prepares, based on inputted luminance information Y, background image data in respect of luminance, detects image portions where inputted image data is different in luminance from the prepared background image data, and provides the result of detection as binary data.

[S14] The mask/background/difference section 15 prepares, based on inputted color information θc, background image data in respect of hue, detects image portions where inputted image data is different in hue from the prepared background image data, and provides the result of detection as binary data.

[S15] The mask/background/difference section 17 prepares, based on inputted designated color information Ic, background image data in respect of color intensity, detects image portions where inputted image data is different in color intensity from the prepared background image data, and provides the result of detection as binary data.

[S16] The matrix processing section 19 performs logical processing of the binary data obtained in Steps S13–15, depending on detection mode, discrimination between day and night and intensity of illuminance.

[S17] The expansion and contraction section 20 performs expansion and contraction processing of the image portions detected by the mask/background/difference section 17 based on inputted designated color information Ic.

[S18] The stagnation extracting section 22 detects edge portions and obtains values of the detected edge portions projected in Y direction.

[S19] The stationary object extracting section 21 prepares second background image data and obtains difference between first and second background image data.

[S20] The judging section 23 judges individual vehicles based on the projected values fed from the stagnation extracting section 22, calculates the number of vehicles and the velocity of the rearmost vehicle, and judges the state of traffic stagnation based on the obtained number and velocity. The judging section 23 also detects existence of stopping vehicles and objects fallen from vehicles based on the binary data upon difference between first and second background image data fed from the stationary object extracting section 21.

[S21] Based on the result of judgment by the judging section 23, the monitoring display section 24 provides indication of traffic stagnation, stopping vehicles, existence of fallen objects and so forth.

As described above, the present invention is provided with the hue change detecting means which detects, in image data fed from the color image pick-up camera, image portions where the image data is different in hue from background image data which is prepared by taking a time average of hue for each picture element. The overlapping portion extracting and judging means extracts overlapping portions between image portions detected by the luminance change detecting means when it is in the daytime and illuminance is larger than a predetermined value and image portions detected by the hue change detecting means at the same point of time, and judges the extracted overlapping portions to represent detection objects existing on the road. Thus, when it is in the daytime and illuminance is larger than a certain value so that false judgment due to a shadow of a cloud is liable to occur, image portions where inputted image data is different in luminance from the relevant background image data but not different in hue from the relevant background image data are not judged to represent detection objects. If detection is conducted by the luminance change detecting means alone, a shadow of a cloud which is formed on a road when it is in the daytime and illuminance is larger than a certain value is falsely judged to be an object to be detected. The present invention can avoid such false judgment.

The comprehensive portion extracting and judging means extracts comprehensive portions covering image portions detected by the luminance change detecting means when it is in the daytime and illuminance is smaller than a predetermined value and image portions detected by the hue change detecting means at the same point of time, and judges the extracted comprehensive portions to represent detection objects existing on the road. By utilizing not only difference in luminance but also difference in hue, omission of detection is prevented when it is in the daytime and illuminance is smaller than a certain value.

In the nighttime, vehicles are detected relying on a color of their taillights. The designated-color image portion detecting means detects, in image data fed from the color image pick-up camera, image portions having a designated color (color of taillights of vehicles). The color intensity change detecting means detects, within the image portions detected by the designated-color image portion detecting means, image portions where the image data is different in color intensity from background image data which is prepared by taking a time average of color intensity for each picture element. The judging means judges the image portions detected by the color intensity change detecting means in the nighttime to represent detection objects existing on a road. Thus, false detection of vehicles in the nighttime is prevented.

It is noted that picture elements having spectrum of all colors are detected in the image data fed from the color image pick-up camera, and excluded from the image portions detected by the designated-color image portion detecting means. Thus, a road surface lightened by headlights will not be falsely judged to be detection objects.

The threshold values used for obtaining binary data upon difference in luminance, difference in hue and difference in designated color intensity are determined depending on spatial average values of luminance, hue and designated color intensity of respective background image data. In addition, those spatial average values of respective background image data are calculated for each of a plurality of image sections into which image data is divided along the represented lanes of road. Thus, the differences in luminance, hue and designated-color intensity can be detected more accurately.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A detecting device for road monitoring which detects traveling states of vehicles on a road or fallen objects on a road, comprising:
 a color image pick-up camera for picking up images of a road;
 luminance change detecting means for detecting, in image data fed from said color image pick-up camera, image portions where the image data is different in luminance from background image data which is prepared by taking a time average of luminance for each picture element;
 hue change detecting means for detecting, in image data fed from said color image pick-up camera, image portions where the image data is different in hue from background image data which is prepared by taking a time average of hue for each picture element; and
 overlapping portion extracting and judging means for extracting overlapping portions between image portions detected by said luminance change detecting means when it is in the daytime and illuminance is larger than a predetermined value and image portions detected by said hue change detecting means at the same point of time, and judging the extracted overlapping portions to represent objects existing on the road and to be detected.

2. A detecting device for road monitoring which detects traveling states of vehicles on a road or fallen objects on a road, comprising:
 a color image pick-up camera for picking up images of a road;
 luminance change detecting means for detecting, in image data fed from said color image pick-up camera, image portions where the image data is different in luminance from background image data which is prepared by taking a time average of luminance for each picture element;
 hue change detecting means for detecting, in image data fed from said color image pick-up camera, image portions where the image data is different in hue from background image data which is prepared by taking a time average of hue for each picture element; and
 comprehensive portion extracting and judging means for extracting comprehensive portions covering image portions detected by said luminance change detecting means when it is in the daytime and illuminance is smaller than a predetermined value and image portions detected by said hue change detecting means at the same point of time, and judging the extracted comprehensive portions to represent objects existing on the road and to be detected.

3. A detecting device for road monitoring which detects traveling states of vehicles on a road or fallen objects on a road, comprising:
 a color image pick-up camera for picking up images of a road;
 designated-color image portion detecting means for detecting, in image data fed from said color image pick-up camera, image portions having a designated color;
 color intensity change detecting means for detecting, within the image portions detected by said designated-color image portion detecting means, image portions where the image data is different in color intensity from background image data which is prepared by taking a time average of color intensity for each picture element; and
 judging means for judging the image portions detected by said color intensity change detecting means in the nighttime to represent objects existing on the road and to be detected.

4. A detecting device for road monitoring according to claim 3, wherein said detecting device further comprises excluding means for detecting, in the image data fed from said color image pick-up camera, picture elements having spectrum of all colors and excluding the detected picture elements from the image portions detected by said designated-color image portion detecting means.

5. A detecting device for road monitoring according to claim 3, wherein said designated-color image portion detecting means detects, in the image data fed from said color image pick-up camera, image portions having a color of taillights of vehicles.

6. A detecting device for road monitoring according to claim 5, wherein said detecting device further comprises image processing means for expanding and contracting the image portions detected by said color intensity change detecting means in a direction transversal to a road represented in the image data, thereby making image portions representing a pair of taillights of a vehicle into one image.

7. A detecting device for road monitoring which detects traveling states of vehicles on a road or fallen objects on a road, comprising:
 a color image pick-up camera for picking up images of a road;
 dividing means for dividing image data fed from said color image pick-up camera into a plurality of image sections according to lanes of road represented in the image data, so that each lane represented in the image data consists of a plurality of image sections being in line;
 average luminance calculating means for calculating a spatial average of luminance in each image section prepared by said dividing means;
 threshold value determining means for automatically determining a threshold value for each image section, based on the spatial average of luminance in each image section calculated by said average luminance calculating means;
 background image data preparing means for obtaining a time average of luminance for each picture element in each image section prepared by said dividing means, thereby preparing background image data for each image section;
 difference calculating means for calculating difference in luminance for each picture element between each image section prepared by said dividing means and the background image data for each image section prepared by said background image data preparing means;
 binary processing means for making the difference in luminance calculated by said difference calculating means into binary data, using the threshold value determined for each image section by said threshold value determining means; and
 object detecting means for detecting objects existing on the road, based on the binary data prepared by said binary processing means.

8. A detecting device for road monitoring which detects traveling states of vehicles on a road or fallen objects on a road, comprising:

a color image pick-up camera for picking up images of a road;

dividing means for dividing image data fed from said color image pick-up camera into a plurality of image sections according to lanes of road represented in the image data, so that each lane represented in the image data consists of a plurality of image sections being in line;

average hue calculating means for calculating a spatial average of hue in each image section prepared by said dividing means;

threshold value determining means for determining a threshold value for each image section, based on the spatial average of hue in each image section calculated by said average hue calculating means;

background image data preparing means for obtaining a time average of hue for each picture element in each image section prepared by said dividing means, thereby preparing background image data for each image section;

difference calculating means for calculating difference in hue for each picture element between each image section prepared by said dividing means and the background image data for each image section prepared by said background image data preparing means;

binary processing means for making the difference in hue calculated by said difference calculating means into binary data, using the threshold value determined for each image section by said threshold value determining means; and object detecting means for detecting objects existing on the road, based on the binary data prepared by said binary processing means.

* * * * *